United States Patent [19]

Hayashi

[11] Patent Number: 5,291,508
[45] Date of Patent: Mar. 1, 1994

[54] GAS LASER TUBE

[75] Inventor: Koji Hayashi, Tokyo, Japan

[73] Assignee: NEC Corporation, Tokyo, Japan

[21] Appl. No.: 907,555

[22] Filed: Jul. 2, 1992

[30] Foreign Application Priority Data

Jul. 2, 1991 [JP] Japan .................. 3-161262

[51] Int. Cl.[5] .............................................. H01S 3/03
[52] U.S. Cl. .................................. 372/65; 372/87; 372/62
[58] Field of Search ............... 372/65, 64, 92, 62, 372/87

[56] References Cited

U.S. PATENT DOCUMENTS

| 3,784,927 | 1/1974 | Rudolph | 372/65 |
| 4,081,762 | 5/1978 | Gloser et al. | 372/65 |
| 4,203,080 | 5/1980 | Wright et al. | 372/65 |
| 4,429,399 | 1/1984 | Kaneko et al. | 372/65 |
| 4,553,240 | 11/1985 | Schmid | 372/65 |
| 4,644,554 | 2/1987 | Sheng | 372/65 |
| 4,823,356 | 4/1989 | Riley | 372/65 |
| 4,866,726 | 9/1989 | Ortiz et al. | 372/61 |
| 4,947,403 | 8/1990 | Ishihara et al. | 372/65 |
| 5,048,043 | 9/1991 | Welsch et al. | 372/61 |
| 5,048,046 | 9/1991 | Welsch et al. | 372/65 |

FOREIGN PATENT DOCUMENTS 0139887 5/1985 European Pat. Off. .
0348974 1/1990 European Pat. Off. .
2341968 2/1977 France .

Primary Examiner—Leon Scott, Jr.
Attorney, Agent, or Firm—Leydig, Voit & Mayer

[57] ABSTRACT

A structure for holding tubular cathode in a gas laser tube. The cathode is provided at one end with a slender projection inserted into a hollow member attached to one sealing flush member and caulked at a groove formed in the hollow member to hold the cathode. The cathode is also provided with spring plate members at the other end. A slender discharge tube is provided with an expanded portion serving as a discharge chamber, the expanded portion having a smaller diameter than the cathode and pressing against the spring plate members. The spring plate members securely hold the cathode within the gas laser tube without melting or cracking at the sealing flush members during welding.

7 Claims, 4 Drawing Sheets

GAS LASER TUBE

BACKGROUND OF THE INVENTION

The invention relates to a gas laser tube, and more particularly to a structure for holding a cathode in a gas laser tube of the internal mirror type in which enclosure members of the gas laser tube are sealed with sealing flush members at opposite ends of the tube and provided with hollow members with spot facings. Glass face plates are provided at the spot facings of the hollow members.

Referring to FIG. 1, in a conventional gas laser tube of the internal mirror type, enclosure members of the gas laser tube comprise a thick glass tube 4, sealing flush members 1a and 1b, hollow members 2a and 2b with spot facings, and mirrors 10. The thick glass tube at its opposite ends is sealed with the sealing flush members 1a and 1b which are respectively provided with the hollow members 2a and 2b with the spot facings. The hollow members 2a and 2b are respectively provided with mirrors 10 at the spot facings. The sealing flush members 1a and 1b are respectively attached to the hollow members 2a and 2b by soldering. A gap between the hollow member and the mirror is sealed with a low melting point glass material 9. The hollow member 2b serves as an anode.

A conventional structure for mounting the cathode to the enclosure members in the gas gas laser tube will be described. The tube type cathode made of aluminum is attached at a welding region 14 to the sealing flush member 1a by welding. The enclosure members at the anode side are provided with a discharge chamber 8 which is provided with an outlet for releasing a gas within the discharge chamber 8. A slender discharge tube 7 at the anode side is attached to a wall of the discharge chamber 8. The thick glass tube 4 and the slender discharge tube are formed as an integral structure through the wall of the discharge chamber 8. The thick glass tube 4, the cathode 5 and the slender discharge tube 7 are arranged coaxially.

In the conventional structure for holding the cathode in the gas laser tube of the internal mirror type as shown in FIG. 1, the cathode 5 is attached to the sealing flush member 1a only by means of a resistance welding. The sealing flush member la is made of Kovar (Fernico). In contrast, the cathode 5 is made of aluminum. The sealing flush member has an electrical resistance higher than that of the cathode. Consequently, when the sealing flush member 1a is subjected to the resistance welding, the welding region 14 of the sealing flush member 1a has a tendency of melting or cracking, causing leaks. Assuming that the welding for attaching the cathode 5 to the sealing flush member 1a is carried out with a low welding current, the strength of the attachment of the cathode 5 to the sealing flush member 1a is so weak as to tend to pull out the cathode from the sealing flush member 1a.

On the other hand, an alternate conventional structure for mounting the cathode to the enclosure members in the gas gas laser tube will be described. Referring to FIG. 2, the cathode 5 at its top portion is provided with a slender projection. The hollow member 2a attached to the sealing flush member 1a is formed at its hollow portion with a ring-shaped groove 13. The slender projection of the cathode is inserted into the hollow member 2a and caulked with the ring-shaped groove 13 formed in the hollow member 2a so as to hold the cathode in the gas laser tube.

In such a structure for holding the cathode, the cathode 5 may be held to the enclosure members of the gas laser tube without welding, the gas laser tube therefore does not have the problems of melting or cracking of the sealing flush member by welding. The cathode is, however, attached to the sealing flush member only by the caulking of the slender projection of the cathode with the ringshaped groove in the hollow member. In operation of the gas laser, the cathode and the hollow member are subjected to vibrations and thermal expansion. Thus, the caulking of the slender projection of the cathode tends to loosen or the cathode tends to pull out from the sealing flush member.

SUMMARY OF THE INVENTION

An object of the present invention is to provide a gas laser tube of an inner mirror type having a novel structure for holding a cathode to enclosure members thereof.

A gas laser tube of an inner mirror type according to the present invention comprises a plurality of enclosure members, a tubular cathode, a discharge tube provided at one end with an expanded portion having a smaller diameter than that of the cathode, the discharge tube being attached to the enclosure member through the expanded portion, and means attached to the cathode for making the cathode secure to an inner wall of the enclosure members at its opposite side, the means being pressed against the expanded portion The enclosure members comprise a thick glass tube, sealing flush members provided at opposite ends of the thick glass tube, hollow members with a spot facing attached to each of the sealing flush members, and mirrors attached to each of the hollow members at the spot facing. The cathode at its top portion is provided with a slender projection to be inserted into the hollow member. The slender projection of the cathode is caulked with a groove formed in the hollow member. The expanded portion may serve as a discharge chamber. The means for making the cathode secure to the inner wall of the enclosure members may comprise at least one spring plate member.

In the novel gas laser tube of the inner mirror type according to the present invention, the cathode is provided with the means for mounting the cathode securely to the enclosure members. The discharge tube is provided with the expanded portion to press against the means for making the cathode secure to the enclosure members. Further, the slender projection of the cathode is inserted into the hollow member and caulked with the groove formed in the hollow member. This securely holds the cathode within the gas laser tube of the inner mirror type without the problems associated with the prior arts.

BRIEF DESCRIPTION OF THE DRAWINGS

Preferred embodiments of the present invention will hereinafter fully be described in detail with reference to the accompanying drawings in which.

PREFERRED EMBODIMENTS OF THE INVENTION

A first embodiment of a novel structure for holding a cathode to enclosure members in a gas laser tube of an inner mirror type according to the present invention will be described.

Figure 1:
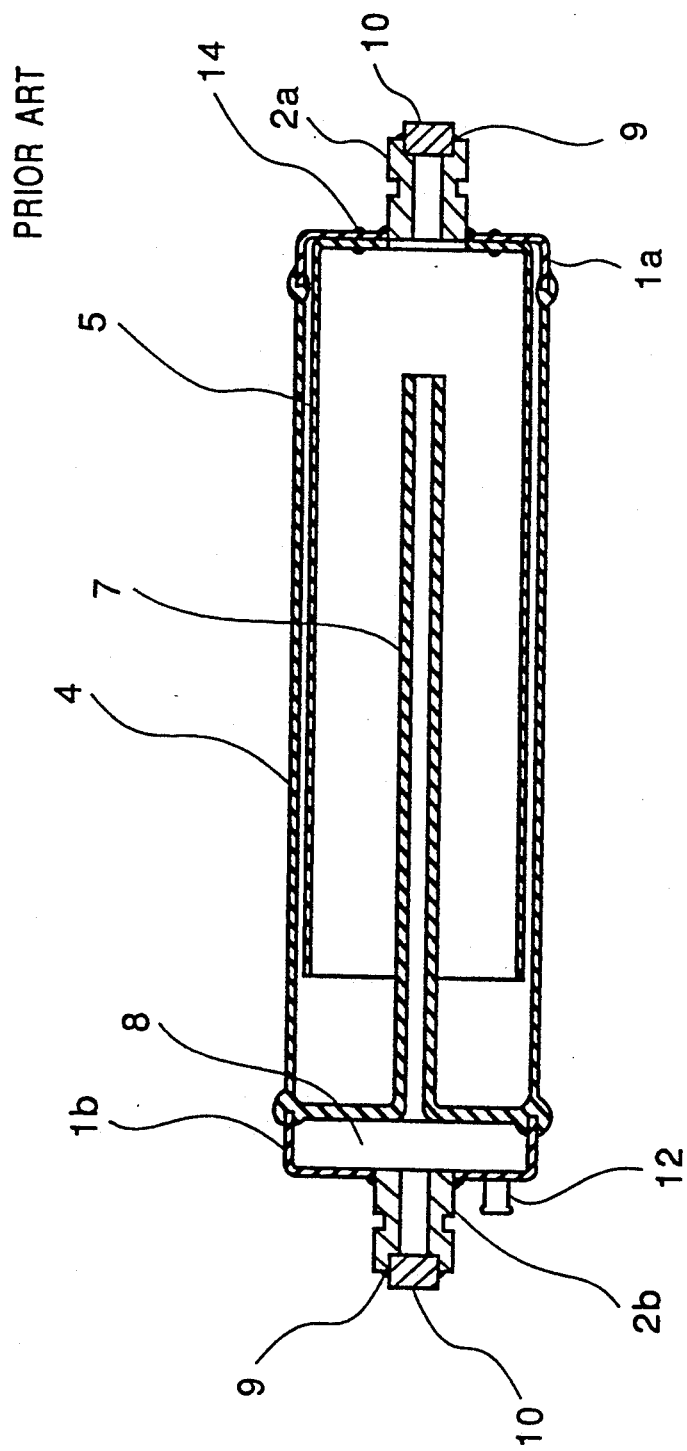
FIG. 1 is a longitudinal sectional view illustrative of one example of the conventional structure for holding a cathode to enclosure members in the gas laser tube of the inner mirror type.
Figure 2:
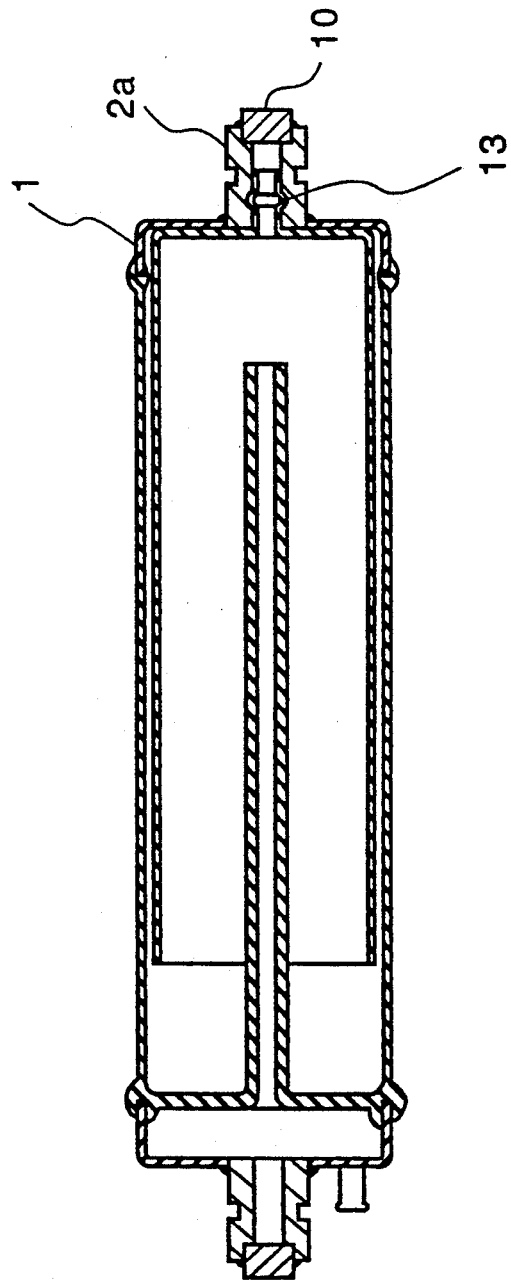
FIG. 2 is a longitudinal sectional view illustrative of an alternate example of the conventional structure for holding a cathode to enclosure members in the gas laser tube of the inner mirror type.
Figure 3:
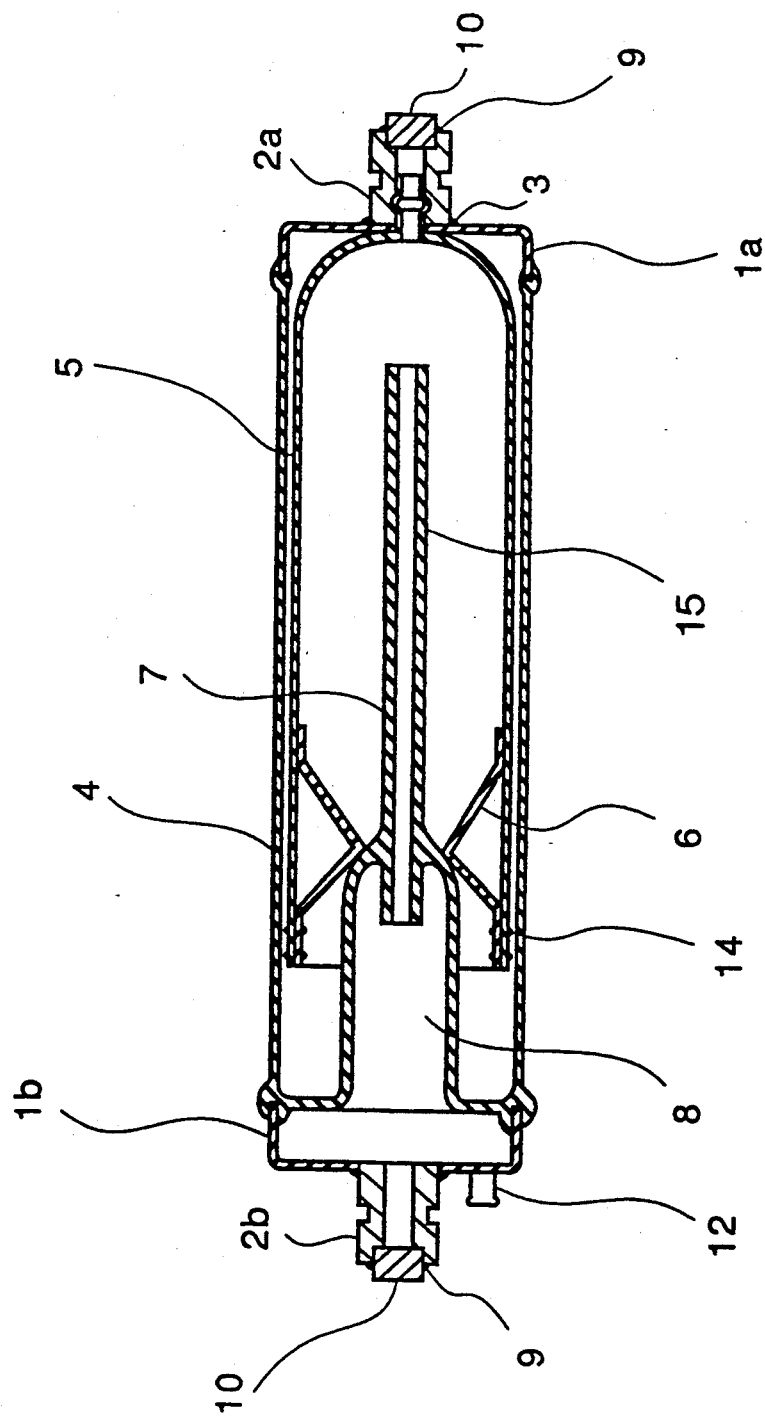
FIG. 3 is a longitudinal sectional view illustrative of one embodiment of a novel structure for holding a cathode to enclosure members in a gas laser tube of an inner mirror type according to the present invention.

Referring now to FIG. 3, the enclosure members comprise a thick glass tube 4, sealing flush members 1a and 1b, hollow members 2a and 2b with a spot facing, and mirrors 10. The thick glass tube 4 is made of a sodium borosilicate glass which is sealed at its opposite ends with the sealing flush members 1a and 1b made of Kovar (Fernico). The sealing flush members 1a and 1b are respectively provided with the hollow members 2a and 2b with the spot facing which are made of 426-alloy. The hollow members 2a and 2b are respectively provided with mirrors 10 at the spot facing. The flush members 1a and 1b are respectively attached with the hollow members 2a and 2b by a soldering material 3. A gap between the hollow member and the mirror is sealed with a low melting glass material 9. The hollow member 2b serves as an anode.

A novel structure for holding the cathode to the enclosure members in the gas laser tube according to the invention will be described. A tubular aluminum cathode 5 is provided with a slender projection inserted into the hollow member 2a. The slender projection of the cathode is caulked with a ring-shaped groove formed in the hollow member 2a to hold the cathode. A unitary discharge tube 7 includes an expanded portion serving as a discharge chamber 8 which has a smaller diameter than that of the cathode 5 and a slender tube portion 15 smaller in diameter than the discharge chamber 8. The discharge tube 7 is made of a sodium borosilicate glass. The slender discharge tube 15 and the discharge chamber 8 are also formed as an integral structure by flare processing. The discharge chamber 8 is attached to the enclosure members of the gas laser tube. The thick glass 4, the cathode 5, the slender discharge tube 15 and the chamber 8 are arranged coaxially. The sealing flush member 1b is provided with an outlet 12 for releasing a gas within the discharge chamber 8. A plurality of V-shaped spring plate members 6 made of stainless steel are attached to an inner wall of the cathode at its anode side by welding and pressing against the discharge chamber 8 but not against the slender tubular portion 15 of the discharge tube 7. The spring plate members 6 secure the cathode 5 to an inner wall of the sealing flush member 1a. Further, the slender projection of the cathode is inserted into the hollow member 2a and caulked with the ring-shaped groove formed in the hollow member 2a, whereby the cathode is securely held within the enclosure members of the gas laser tube.

A second embodiment of a novel structure for holding a cathode to enclosure members in a gas laser tube of an inner mirror type according to the present invention will be described.

Figure 4:
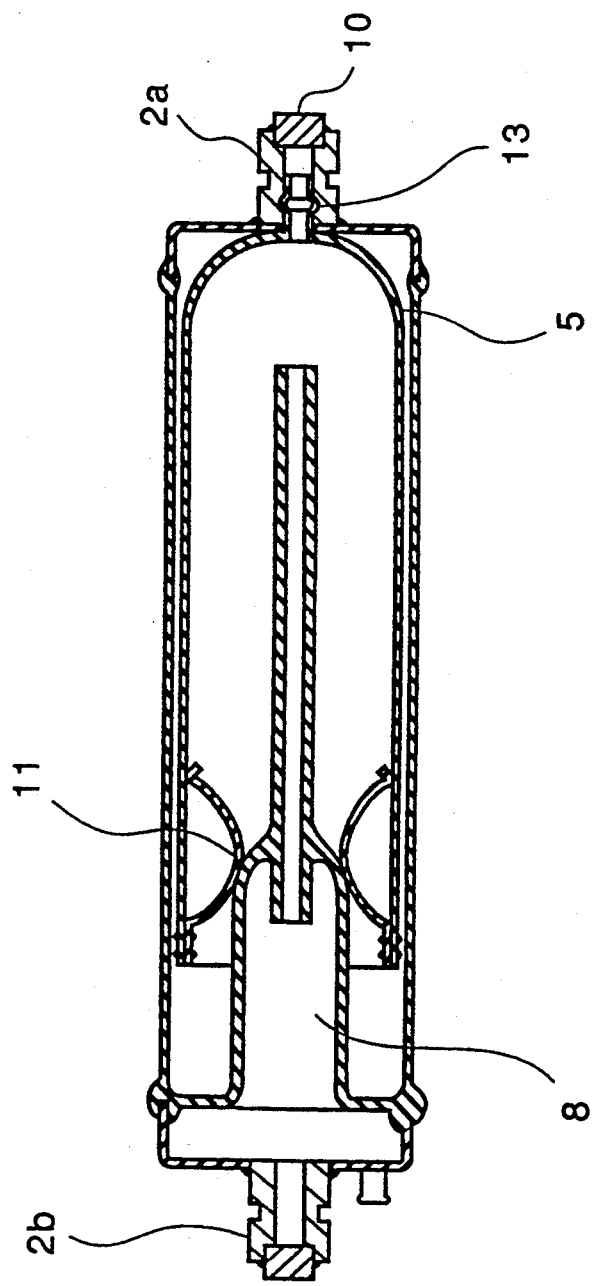
FIG. 4 is a longitudinal sectional view illustrative of an alternate embodiment of a novel structure for holding a cathode to enclosure members in a gas laser tube of an inner mirror type according to the present invention.

Referring to FIG. 4, with regard to means for making the cathode secure to the enclosure members, a plurality of arched spring plate members 11 made of SUS304 are attached to the cathode at its anode side by welding and press against the discharge chamber 8. The spring plate members 6 allow to operate to make the cathode 5 secure to the sealing flush member 1a of the enclosure members, whereby the cathode is securely held within the enclosure members of the gas laser tube.

In the gas laser tube according to the present invention, the means for making the cathode secure to the enclosure members may comprise an elastic member, for example, a spring plate member. The spring plate member for making the cathode secure to the enclosure members may be made in various shapes. The means for making the cathode secure to the enclosure members may comprise one or more elastic members. The location of the spring plate member may be selected in association with various structures in gas laser tubes.

Since the novel structure for holding the cathode in the gas laser tube according to the invention allows the cathode to be held relative to the enclosure members without resistance welding, the novel gas laser tube has no problem of melting or cracking in the sealing flush member to cause leaks or pulling of the cathode from the sealing flush member. Further, since the spring plate member secures the cathode to the sealing flush member of the enclosure members, the cathode 5 is securely held without loosening of caulking of the slender projection of the cathode or pulling out from the sealing flush member of the enclosure members.

Whereas alternations and modifications of the present invention will no doubt be apparent to a person of ordinary skill in the art, it is to be understood that the embodiments shown and described by way of illustration are by no means intended to be considered limiting. Accordingly, it is to be intended by the claims to cover all alternatives of the invention which fall in the spirit and scope of the invention.

What is claimed is:

1. A gas laser tube comprising:

an enclosure having an inner wall;

a tubular cathode having opposed first and second ends and a diameter, said cathode being disposed within said enclosure and attached to said enclosure at the second end of said tubular cathode;

a discharge tube having opposed first and second ends and, at the first end, an expanded portion having a smaller diameter than the diameter of said cathode and, at the second end, a slender tube portion, said discharge tube being attached to said enclosure at the first end at said expanded portion, the second end of said discharge tube being disposed within and spaced from said tubular cathode; and means for securing said tubular cathode at the first end to said expanded portion of said discharge tube within and to said tubular cathode, said means for securing being attached to said tubular cathode and pressing against said expanded portion of said discharge tube.

2. The gas laser tube as claimed in claim 1 wherein said expanded portion comprises a discharge chamber.

3. The gas laser tube as claimed in claim 1 wherein said means for securing said cathode comprises at least one elastic member.

4. The gas laser tube as claimed in claim 3 wherein said elastic member comprises a spring plate.

5. The gas laser tube as claimed in claim 4 wherein said spring plate comprises a V-shaped winding plate.

6. The gas laser tube as claimed in claim 4 wherein said spring plate comprises an arched plate.

7. The gas laser tube as claimed in claim 1 wherein said means for securing does not press against said slender tube portion.

* * * * *